United States Patent
Candelore et al.

(10) Patent No.: US 9,237,294 B2
(45) Date of Patent: Jan. 12, 2016

(54) APPARATUS AND METHOD FOR REPLACING A BROADCASTED ADVERTISEMENT BASED ON BOTH HEURISTIC INFORMATION AND ATTEMPTS IN ALTERING THE PLAYBACK OF THE ADVERTISEMENT

(75) Inventors: Brant L. Candelore, San Diego, CA (US); Frederick J. Zustak, Poway, CA (US)

(73) Assignee: Sony Corporation, Tokyo (JP)

(*) Notice: Subject to any disclaimer, the term of this patent is extended or adjusted under 35 U.S.C. 154(b) by 486 days.

(21) Appl. No.: 12/772,544

(22) Filed: May 3, 2010

(65) Prior Publication Data

US 2011/0219401 A1 Sep. 8, 2011

Related U.S. Application Data

(60) Provisional application No. 61/311,035, filed on Mar. 5, 2010.

(51) Int. Cl.
*H04H 60/32* (2008.01)
*H04N 5/445* (2011.01)
*H04N 5/91* (2006.01)
(Continued)

(52) U.S. Cl.
CPC .............. *H04N 5/445* (2013.01); *G06Q 30/02* (2013.01); *H04N 5/91* (2013.01); *H04N 7/025* (2013.01); *H04N 21/44016* (2013.01); *H04N 21/458* (2013.01); *H04N 21/4532* (2013.01); *H04N 21/4751* (2013.01); *H04N 21/4755* (2013.01); *H04N 21/4756* (2013.01); *H04N 21/812* (2013.01); *H04N 21/84* (2013.01)

(58) Field of Classification Search
CPC .......... H04N 21/4307; H04N 21/2542; H04N 21/4331; H04N 21/4333; H04N 21/4622; H04N 21/47815
USPC ..................... 725/14, 21, 32, 34, 35
See application file for complete search history.

(56) References Cited

U.S. PATENT DOCUMENTS 3,785,721 A  1/1974  Harsch
4,305,131 A  12/1981 Best (Continued)

FOREIGN PATENT DOCUMENTS

EP  1990763     11/2008
JP  H11119688   4/1999
JP  2006279334  10/2006

OTHER PUBLICATIONS

U.S. Appl. No. 12/718,697, Non-Final Office Action, mailed Apr. 11, 2012.

(Continued)

*Primary Examiner* — Pankaj Kumar
*Assistant Examiner* — Timothy Newlin
(74) *Attorney, Agent, or Firm* — John L. Rogitz

(57) ABSTRACT

According to one embodiment of the invention, an apparatus comprises a data storage unit and a data processing unit. The data storage unit is adapted to store a plurality of advertisements. Coupled to the data storage unit, the data processing unit is adapted to detect an operation that alters playback of an advertisement being part of downloaded digital content, and in response to detecting the operation, to select one of the stored advertisements. The selection is based on heuristic information that is maintained for each of the plurality of stored advertisements.

15 Claims, 9 Drawing Sheets

(51) Int. Cl.
*H04N 7/025* (2006.01)
*G06Q 30/02* (2012.01)
*H04N 21/44* (2011.01)
*H04N 21/45* (2011.01)
*H04N 21/458* (2011.01)
*H04N 21/475* (2011.01)
*H04N 21/81* (2011.01)
*H04N 21/84* (2011.01)

(56) References Cited

U.S. PATENT DOCUMENTS

| | | | |
|---|---|---|---|
| 4,821,097 | A | 4/1989 | Robbins |
| 5,100,154 | A | 3/1992 | Mullins |
| 5,111,410 | A | 5/1992 | Nakayama et al. |
| 5,303,148 | A | 4/1994 | Mattson et al. |
| 5,327,521 | A | 7/1994 | Savic et al. |
| 5,410,326 | A | 4/1995 | Goldstein |
| 5,446,488 | A | 8/1995 | Vogel |
| 5,559,707 | A | 9/1996 | DeLorme et al. |
| 5,589,892 | A | 12/1996 | Knee et al. |
| 5,600,765 | A | 2/1997 | Ando et al. |
| 5,615,123 | A | 3/1997 | Davidson et al. |
| 5,633,678 | A | 5/1997 | Parulski et al. |
| 5,634,012 | A | 5/1997 | Stefik et al. |
| 5,643,088 | A | 7/1997 | Vaughn et al. |
| 5,679,075 | A | 10/1997 | Forrest et al. |
| 5,682,525 | A | 10/1997 | Bouve et al. |
| 5,710,887 | A | 1/1998 | Chelliah et al. |
| 5,721,827 | A | 2/1998 | Logan et al. |
| 5,727,093 | A | 3/1998 | Uchiyama et al. |
| 5,727,201 | A | 3/1998 | Burke |
| 5,732,216 | A | 3/1998 | Logan et al. |
| 5,737,538 | A | 4/1998 | Wilhite |
| 5,740,549 | A | 4/1998 | Reilly et al. |
| 5,748,898 | A | 5/1998 | Ueda |
| 5,760,916 | A | 6/1998 | Dellert et al. |
| 5,768,142 | A | 6/1998 | Jacobs |
| 5,768,528 | A | 6/1998 | Stumm |
| 5,771,354 | A | 6/1998 | Crawford |
| 5,781,665 | A | 7/1998 | Cullen et al. |
| 5,794,006 | A | 8/1998 | Sanderman |
| 5,802,292 | A | 9/1998 | Mogul |
| 5,819,092 | A | 10/1998 | Ferguson et al. |
| 5,845,062 | A | 12/1998 | Branton et al. |
| 5,845,281 | A | 12/1998 | Benson et al. |
| 5,852,450 | A | 12/1998 | Thingvold |
| 5,855,516 | A | 1/1999 | Eiba |
| 5,857,074 | A | 1/1999 | Johnson |
| 5,864,329 | A | 1/1999 | Hirokawa |
| 5,872,637 | A | 2/1999 | Nakanishi |
| 5,880,778 | A | 3/1999 | Akagi |
| 5,881,168 | A | 3/1999 | Takaoka et al. |
| 5,884,141 | A | 3/1999 | Inoue et al. |
| 5,884,280 | A | 3/1999 | Yoshioka et al. |
| 5,889,868 | A | 3/1999 | Moskowitz et al. |
| 5,907,321 | A | 5/1999 | Grossman et al. |
| 5,918,009 | A | 6/1999 | Gehani et al. |
| 5,923,846 | A | 7/1999 | Gage et al. |
| 5,937,392 | A | 8/1999 | Alberts |
| 5,940,600 | A | 8/1999 | Staats et al. |
| 5,940,806 | A | 8/1999 | Danial |
| 5,942,969 | A | 8/1999 | Wicks |
| 5,944,769 | A | 8/1999 | Musk et al. |
| 5,948,040 | A | 9/1999 | DeLorme et al. |
| 5,948,061 | A | 9/1999 | Merriman |
| 5,949,875 | A | 9/1999 | Walker et al. |
| 5,960,409 | A | 9/1999 | Wexler |
| 5,963,664 | A | 10/1999 | Kumar et al. |
| 5,968,120 | A | 10/1999 | Guedalia |
| 5,970,143 | A | 10/1999 | Schneier et al. |
| 5,974,451 | A | 10/1999 | Simmons |
| 5,982,891 | A | 11/1999 | Ginter et al. |
| 5,982,944 | A | 11/1999 | Vaidyanathan et al. |
| 5,983,200 | A | 11/1999 | Slotznick |
| 5,991,740 | A | 11/1999 | Messer |
| 6,005,548 | A | 12/1999 | Latypov et al. |
| 6,005,987 | A | 12/1999 | Nakamura et al. |
| 6,006,197 | A | 12/1999 | Bolt |
| 6,006,231 | A | 12/1999 | Popa |
| 6,011,537 | A | 1/2000 | Slotznick |
| 6,014,681 | A | 1/2000 | Walker et al. |
| 6,014,701 | A | 1/2000 | Chaddha |
| 6,018,761 | A | 1/2000 | Uomini |
| 6,021,433 | A | 2/2000 | Payne et al. |
| 6,023,701 | A | 2/2000 | Malik et al. |
| 6,026,371 | A | 2/2000 | Beck et al. |
| 6,034,593 | A | 3/2000 | Chase |
| 6,035,323 | A | 3/2000 | Narayen et al. |
| 6,041,316 | A | 3/2000 | Allen |
| 6,044,181 | A | 3/2000 | Szeliski et al. |
| 6,052,600 | A | 4/2000 | Fette et al. |
| 6,058,379 | A | 5/2000 | Odom et al. |
| 6,058,428 | A | 5/2000 | Wang et al. |
| 6,067,095 | A | 5/2000 | Danieli |
| 6,074,299 | A | 6/2000 | Cohen |
| 6,075,551 | A | 6/2000 | Berezowski |
| 6,076,077 | A | 6/2000 | Saito |
| 6,081,278 | A | 6/2000 | Chen |
| 6,085,195 | A | 7/2000 | Hoyt et al. |
| 6,088,702 | A | 7/2000 | Plantz et al. |
| 6,097,389 | A | 8/2000 | Morris et al. |
| 6,102,796 | A | 8/2000 | Pajitnov et al. |
| 6,109,923 | A | 8/2000 | Rothenberg |
| 6,123,362 | A | 9/2000 | Squilla et al. |
| 6,147,742 | A | 11/2000 | Bell et al. |
| 6,169,544 | B1 | 1/2001 | Onoda |
| 6,178,258 | B1 | 1/2001 | Sugimoto |
| 6,202,061 | B1 | 3/2001 | Khosla et al. |
| 6,215,526 | B1 | 4/2001 | Barton et al. |
| 6,216,112 | B1 | 4/2001 | Fuller et al. |
| 6,222,947 | B1 | 4/2001 | Koba |
| 6,224,486 | B1 | 5/2001 | Walker et al. |
| 6,226,533 | B1 | 5/2001 | Akahane |
| 6,236,333 | B1 | 5/2001 | King |
| 6,237,010 | B1 | 5/2001 | Hui et al. |
| 6,240,555 | B1 | 5/2001 | Shoff et al. |
| 6,252,634 | B1 | 6/2001 | Yuen et al. |
| 6,272,231 | B1 | 8/2001 | Maurer et al. |
| 6,282,330 | B1 | 8/2001 | Yokota et al. |
| 6,301,555 | B2 | 10/2001 | Hinderks |
| 6,301,586 | B1 | 10/2001 | Yang et al. |
| 6,312,337 | B1 | 11/2001 | Edwards et al. |
| 6,313,835 | B1 | 11/2001 | Gever et al. |
| 6,333,752 | B1 | 12/2001 | Hasegawa et al. |
| 6,336,052 | B1 | 1/2002 | Rannou |
| 6,340,971 | B1 | 1/2002 | Janse et al. |
| 6,343,738 | B1 | 2/2002 | Ogilvie |
| 6,358,341 | B1 | 3/2002 | Bergquist |
| 6,362,900 | B1 | 3/2002 | Squilla et al. |
| 6,369,835 | B1 | 4/2002 | Lin |
| 6,369,837 | B1 | 4/2002 | Schirmer |
| 6,396,963 | B2 | 5/2002 | Shaffer et al. |
| 6,408,301 | B1 | 6/2002 | Patton et al. |
| 6,411,744 | B1 | 6/2002 | Edwards |
| 6,431,448 | B1 | 8/2002 | Nelson et al. |
| 6,434,579 | B1 | 8/2002 | Shaffer et al. |
| 6,437,797 | B1 | 8/2002 | Ota |
| 6,441,854 | B2 | 8/2002 | Fellegara et al. |
| 6,457,045 | B1 | 9/2002 | Hanson et al. |
| 6,463,468 | B1 | 10/2002 | Buch et al. |
| 6,469,711 | B2 | 10/2002 | Foreman et al. |
| 6,484,189 | B1 | 11/2002 | Gerlach et al. |
| 6,490,000 | B1 | 12/2002 | Schaefer et al. |
| 6,496,851 | B1 | 12/2002 | Morris et al. |
| 6,505,169 | B1 | 1/2003 | Bhagavath et al. |
| 6,509,910 | B1 | 1/2003 | Agarwal et al. |
| 6,512,570 | B2 | 1/2003 | Garfinkle et al. |
| 6,522,418 | B2 | 2/2003 | Yokomizo et al. |
| 6,546,556 | B1 | 4/2003 | Kataoka et al. |
| 6,567,983 | B1 | 5/2003 | Shiimori |
| 6,571,221 | B1 | 5/2003 | Stewart et al. |
| 6,571,255 | B1 | 5/2003 | Gonsalves et al. |
| 6,573,927 | B2 | 6/2003 | Parulski et al. |

(56) References Cited

U.S. PATENT DOCUMENTS

| | | |
|---|---|---|
| 6,578,014 B1 | 6/2003 | Murcko |
| 6,583,799 B1 | 6/2003 | Manolis et al. |
| 6,590,586 B1 | 7/2003 | Swenton-Wall et al. |
| 6,595,417 B2 | 7/2003 | O'Hagan |
| 6,636,648 B2 | 10/2003 | Loui et al. |
| 6,643,663 B1 | 11/2003 | Dabney et al. |
| 6,686,918 B1 | 2/2004 | Cajolet |
| 6,698,020 B1 | 2/2004 | Zigmond et al. |
| 6,704,671 B1 | 3/2004 | Umminger, III |
| 6,747,674 B1 | 6/2004 | Asami |
| 6,795,863 B1 | 9/2004 | Doty |
| 6,892,351 B2 | 5/2005 | Vasudevan et al. |
| 6,914,625 B1 | 7/2005 | Anderson et al. |
| 6,950,623 B2 | 9/2005 | Brown |
| 6,982,649 B2 | 1/2006 | Blum |
| 7,017,173 B1 | 3/2006 | Armstrong et al. |
| 7,079,752 B1* | 7/2006 | Leyendecker ............... 386/255 |
| 7,185,352 B2 | 2/2007 | Hallford et al. |
| 7,334,251 B2* | 2/2008 | Rodriguez et al. ............ 725/42 |
| 7,357,316 B2 | 4/2008 | Heckel et al. |
| 7,418,191 B2 | 8/2008 | Unger |
| 7,443,295 B2 | 10/2008 | Brice et al. |
| 7,463,160 B2 | 12/2008 | Crook |
| 7,730,405 B2 | 6/2010 | Gulli et al. |
| 7,814,522 B2 | 10/2010 | Asmussen |
| 8,321,892 B1* | 11/2012 | Malaby ........................ 725/49 |
| 8,407,595 B1 | 3/2013 | Edwards et al. |
| 2001/0003212 A1 | 6/2001 | Maler et al. |
| 2001/0029610 A1 | 10/2001 | Corvin et al. |
| 2001/0032229 A1 | 10/2001 | Hulls et al. |
| 2001/0034646 A1 | 10/2001 | Hoyt et al. |
| 2001/0037205 A1 | 11/2001 | Joao |
| 2001/0037238 A1 | 11/2001 | Gotoh et al. |
| 2002/0013949 A1 | 1/2002 | Hejna |
| 2002/0038456 A1* | 3/2002 | Hansen et al. ................. 725/46 |
| 2002/0052785 A1 | 5/2002 | Tenenbaum |
| 2002/0059364 A1 | 5/2002 | Coulthard et al. |
| 2002/0078444 A1 | 6/2002 | Krewin et al. |
| 2002/0083441 A1* | 6/2002 | Flickinger et al. ............ 725/32 |
| 2002/0085023 A1 | 7/2002 | Zustak et al. |
| 2002/0087402 A1 | 7/2002 | Zustak et al. |
| 2002/0100041 A1* | 7/2002 | Rosenberg et al. ............ 725/32 |
| 2002/0118182 A1 | 8/2002 | Weindorf |
| 2002/0129362 A1 | 9/2002 | Chang et al. |
| 2002/0144262 A1* | 10/2002 | Plotnick et al. ............... 725/32 |
| 2002/0169970 A1 | 11/2002 | Candelore |
| 2002/0178443 A1* | 11/2002 | Ishii .............................. 725/22 |
| 2002/0178445 A1 | 11/2002 | Eldering et al. |
| 2002/0194081 A1 | 12/2002 | Perkowski |
| 2002/0194593 A1 | 12/2002 | Tsuchida et al. |
| 2003/0028791 A1* | 2/2003 | Mizobata ..................... 713/189 |
| 2003/0028873 A1 | 2/2003 | Lemmons |
| 2003/0037330 A1 | 2/2003 | Makofka |
| 2003/0066078 A1 | 4/2003 | Bjorgan et al. |
| 2003/0070169 A1 | 4/2003 | Beyers, II et al. |
| 2003/0079226 A1* | 4/2003 | Barrett ........................ 725/46 |
| 2003/0093493 A1 | 5/2003 | Watanabe et al. |
| 2003/0115587 A1* | 6/2003 | Kendall et al. ................ 725/9 |
| 2003/0133019 A1 | 7/2003 | Higurashi et al. |
| 2003/0149975 A1 | 8/2003 | Eldering et al. |
| 2003/0154475 A1* | 8/2003 | Rodriguez et al. ............ 725/32 |
| 2003/0163431 A1 | 8/2003 | Ginter et al. |
| 2003/0188308 A1* | 10/2003 | Kizuka ......................... 725/32 |
| 2003/0208469 A1 | 11/2003 | Stern |
| 2004/0001002 A1 | 1/2004 | Blum et al. |
| 2004/0003402 A1 | 1/2004 | McKenna, Jr. |
| 2004/0003406 A1* | 1/2004 | Billmaier ..................... 725/60 |
| 2004/0030599 A1 | 2/2004 | Sie et al. |
| 2004/0034874 A1* | 2/2004 | Hord et al. ................... 725/136 |
| 2004/0103028 A1 | 5/2004 | Littman et al. |
| 2004/0103429 A1 | 5/2004 | Carlucci et al. |
| 2004/0225564 A1 | 11/2004 | Walsh et al. |
| 2004/0249489 A1 | 12/2004 | Dick |
| 2004/0261100 A1 | 12/2004 | Huber et al. |
| 2005/0055715 A1 | 3/2005 | Minnick et al. |
| 2005/0068928 A1 | 3/2005 | Smith et al. |
| 2005/0076359 A1* | 4/2005 | Pierson et al. ................ 725/32 |
| 2005/0100321 A1* | 5/2005 | Koudo et al. ................. 386/86 |
| 2005/0132420 A1 | 6/2005 | Howard et al. |
| 2005/0149968 A1* | 7/2005 | Konig et al. .................. 725/32 |
| 2005/0172319 A1 | 8/2005 | Reichardt et al. |
| 2005/0216932 A1* | 9/2005 | Danker ......................... 725/32 |
| 2005/0247735 A1 | 11/2005 | Muderlak et al. |
| 2005/0283800 A1 | 12/2005 | Ellis et al. |
| 2006/0013557 A1* | 1/2006 | Poslinski ...................... 386/46 |
| 2006/0031892 A1* | 2/2006 | Cohen .......................... 725/88 |
| 2006/0067290 A1 | 3/2006 | Miwa et al. |
| 2006/0085816 A1* | 4/2006 | Funk et al. .................... 725/34 |
| 2006/0091203 A1 | 5/2006 | Bakker et al. |
| 2006/0143647 A1 | 6/2006 | Bill |
| 2006/0165103 A1 | 7/2006 | Trudeau et al. |
| 2006/0168616 A1 | 7/2006 | Candelore |
| 2006/0212904 A1 | 9/2006 | Klarfeld et al. |
| 2007/0078715 A1* | 4/2007 | Murakami ..................... 705/14 |
| 2007/0094691 A1 | 4/2007 | Gazdzinski |
| 2007/0100514 A1 | 5/2007 | Park |
| 2007/0129017 A1 | 6/2007 | Dalsgaard et al. |
| 2007/0194131 A1* | 8/2007 | Brown et al. ................. 235/492 |
| 2007/0204292 A1 | 8/2007 | Riedl et al. |
| 2007/0241203 A1 | 10/2007 | Wagner et al. |
| 2008/0005505 A1 | 1/2008 | Maegawa |
| 2008/0007422 A1 | 1/2008 | Hudson |
| 2008/0046922 A1 | 2/2008 | Jankins et al. |
| 2008/0052739 A1 | 2/2008 | Logan |
| 2008/0052750 A1 | 2/2008 | Grunnet-Jepsen et al. |
| 2008/0077422 A1 | 3/2008 | Dooley et al. |
| 2008/0098421 A1 | 4/2008 | Rodriguez et al. |
| 2008/0136611 A1 | 6/2008 | Benco et al. |
| 2008/0147488 A1 | 6/2008 | Tunick et al. |
| 2008/0155585 A1* | 6/2008 | Craner et al. ................ 725/32 |
| 2008/0276266 A1* | 11/2008 | Huchital et al. ............. 725/32 |
| 2008/0282285 A1 | 11/2008 | Thomas et al. |
| 2008/0307454 A1* | 12/2008 | Ahanger et al. ............. 725/36 |
| 2009/0101706 A1 | 4/2009 | Boyd |
| 2009/0132275 A1 | 5/2009 | Jung et al. |
| 2009/0138353 A1 | 5/2009 | Mendelson |
| 2009/0153736 A1 | 6/2009 | Mortensen |
| 2009/0158314 A1 | 6/2009 | Flynn |
| 2009/0164652 A1 | 6/2009 | Slobotskoy et al. |
| 2009/0172723 A1* | 7/2009 | Shkedi et al. ................. 725/32 |
| 2009/0201998 A1* | 8/2009 | Komoriya ................. 375/240.25 |
| 2009/0262242 A1 | 10/2009 | Castano |
| 2010/0119206 A1 | 5/2010 | Craner et al. |
| 2010/0146077 A1 | 6/2010 | Davies et al. |
| 2010/0166389 A1 | 7/2010 | Knee et al. |
| 2010/0175079 A1* | 7/2010 | Braun et al. ................. 725/32 |
| 2010/0218208 A1 | 8/2010 | Holden |
| 2010/0222046 A1 | 9/2010 | Cumming |
| 2010/0287592 A1 | 11/2010 | Patten et al. |
| 2010/0290761 A1 | 11/2010 | Drake et al. |
| 2011/0029875 A1 | 2/2011 | Milch |
| 2011/0229875 A1 | 2/2011 | Milchi |
| 2011/0072456 A1* | 3/2011 | White et al. .................. 725/32 |
| 2011/0134991 A1* | 6/2011 | Gregotski et al. ......... 375/240.01 |
| 2011/0149159 A1 | 6/2011 | Candelore et al. |
| 2011/0149160 A1 | 6/2011 | Shintani et al. |
| 2011/0150425 A1 | 6/2011 | Candelore et al. |
| 2011/0219400 A1 | 9/2011 | Candelore et al. |
| 2011/0219401 A1 | 9/2011 | Candelore et al. |
| 2011/0219402 A1 | 9/2011 | Candelore et al. |
| 2014/0150017 A1* | 5/2014 | Chang .......................... 725/34 |

OTHER PUBLICATIONS

U.S. Appl. No. 12/772,779, Non-Final Office Action, mailed Jun. 20, 2012.

ZillionTV; 'Introducing the ZillionTV Service—Now You Run the Show', 1170 Kifer Road, Sunnyvale, CA, 94086, Copyright 2009 ZillionTV Corporation, 2 pages.

O'neill, Eileen et al., 6th World Media Economics Conference, Centre d'estudes sur les medias and Journal of Media Economics, HEC Motreal, Montreal, Canada, TiVO—The Next Big Thing?, DVRs and Television Advertising Models, pp. 1-31, May 12-15, 2004.

(56) References Cited

OTHER PUBLICATIONS

Gal-Or, Esther et al., Customized Advertising on Television, 30 pages.

Asai, Kohtaro et al., MPEG-7 Meta-Data Enhanced Encoder System for Embedded Systems, MERL—A Mitsubishi Electric Research Laboratory, http://www.merl.com, TR-2004-009, Mar. 2004, 7 pages.

U.S. Appl. No. 12/718,628, Non-Final Office Action, mailed Apr. 6, 2012.

U.S. Appl. No. 12/718,628, Final Office Action, mailed Sep. 13, 2012.

U.S. Appl. No. 12/718,697, Final Office Action, mailed Aug. 28, 2012.

Brant L. Candelore, Frederick J. Zustak, "Apparatus and Method for Registering and the Subsequent Selection of User Selected Advertisement During Playback", file history of related U.S. Appl. No. 12/718,628, filed Mar. 5, 2010.

Peter Shintai, Brant L. Candelore, "System and Method for Actively Managing Play Back of Demo Content by a Display Device Based on Detected Radio Frequency Signaling", file history of related pending U.S. Appl. No. 12/643,870, filed Dec. 21, 2009.

Robert Hardacker, Brant Candelore, Chris Read, "Providing Information Related to Video Content", file history of related pending U.S. Appl. No. 11/737,363, filed Apr. 19, 2007.

Brant L. Candleore, Peter Shintani, "System and Method for Actively Managing Play Back on Demo Content by Display Device Based on Signaling from a Presence Sensor", file history of related U.S. Appl. No. 12/643,697, filed Dec. 21, 2009.

Peter Shintani, Brant L. Candelore, "System and Method for Actively Managing Play Back of Demo Content by a Display Device Based on Customer Actions", file history of related U.S. Appl. No. 12/643,746, filed Dec. 21, 2009.

Brant L. Candelore, Peter Shintani, "System and Method for Actively Managing Playback of Demo Content by Display Device", file history of related U.S. Appl. No. 12/643,669, filed Dec. 21, 2009.

Stephane Lejeune, "System and Method for Merging Network-based Content with Broadcasted Programming Content" file history of related pending U.S. Appl. No. 13/175,730, filed Jul. 1, 2011.

Eric Edwards, Kurt Jonach, John Tree, "Imaging Service for Automating the Display of Images", file history of related pending U.S. Appl. No. 13/839,172, filed Mar. 15, 2013.

Wowza Media Systems, Wowza Media Server Pro, www.wowzamedia.com/resources/WowzaMediaServerPro_UserGuide.pdf, 2006.

Brant L. Candelore, Fred Rick J. Zustak, "Apparatus and Method for Registering and the Subsequent Selection of User Selected Advertisement During Playback". related U.S. Appl. No. 12/718,628, Non-Final Office Action dated Jul. 21, 2015.

Brant L. Candelore, Frederick J. Zustak, "Apparatus and Method for Registering and the Subsequent Selection of User Selected Advertisement During Playback", related U.S. Appl. No. 12/718,628, Final Office Action dated Sep. 8, 2015.

Brant L. Candelore, Frederick J. Zustak, "Apparatus and Method for Registering and the Subsequent Selection of User Selected Advertisement During Playback", related U.S. Appl. No. 12/718,628, Applicant's response to Non-Final Office Action filed Jul. 28, 2015.

\* cited by examiner

APPARATUS AND METHOD FOR REPLACING A BROADCASTED ADVERTISEMENT BASED ON BOTH HEURISTIC INFORMATION AND ATTEMPTS IN ALTERING THE PLAYBACK OF THE ADVERTISEMENT

CROSS-REFERENCE TO RELATED APPLICATIONS

This application claims the benefit of priority on U.S. Provisional Patent Application No. 61/311,035 filed Mar. 5, 2010.

FIELD

The invention is related to the field of content recordation and playback. More specifically, certain embodiments of the invention are directed to controlled playback of viewer-selected advertisements in response to altering the playback of an advertisement within broadcasted digital content. The selection of the viewer-selected advertisement is based on heuristic information gathered at and after the registration process and confirmation that the playback time period set for the viewer-selected advertisement has not elapsed.

BACKGROUND

Currently, television is widely used as a source of both information and entertainment. Cable and satellite systems broadcast tens or even hundreds of channels of programming. Given the large number of programs that are available to a viewer and are broadcast at prescribed times, in some situations, a viewer may be unable to watch all of the programs that he or she wishes to see. Consequently, over the last few decades, a number of electronic devices have been developed to record broadcast television signals.

For instance, video cassette recorders (VCRs) provide viewers with an ability to record incoming audiovisual programs on a magnetic tape and to subsequently view such programs. A timer in the VCR allows the user to record these audiovisual programs at their prescribed broadcasting time. Consequently, the recorded programs are available for playback at the user's convenience.

Thereafter, the basic concept of VCRs has been extended to a hard-drive or semiconductor based recording devices that is commonly referred to as Personal Video (or Versatile) Recorders (PVRs). Normally, a PVR is connected between a viewer's television and that viewer's cable box, satellite receiver or antenna. The PVR can control the channel tuned on the television, provide an interactive electronic program guide and record programs on a manual or timer-controlled basis.

The PVR can buffer incoming audiovisual programs so that the viewer can pause a "live" television program or replay a portion of a live television program without missing any subsequent segment of the program, as long as the pause or replay does not exceed the storage capacity of the PVR. Additionally, the PVR can be programmed to regularly record a user's favorite programs. Consequently, the PVR provides greater flexibility in recording and capturing incoming audiovisual signals than is available with a VCR.

Within broadcast television programs, advertisements (e.g. television commercials) are interspersed between segments of the audiovisual program and are broadcast as part of the television signal. These advertisements are an important source of revenue for the broadcaster and are an important source in reaching current and potential customers with information related to products and services featured in the advertisement.

However, viewers often consider advertising as a nuisance since they normally want to watch a television program without interruption. Consequently, when a viewer has recorded the program using a PVR, the viewer will tend to fast-forward through the program during commercials or skip ahead. Usually there is no audio playback during a "fast-forward" or "skip" operation. Hence, while the audio is muted, the playback of images is accelerated to minimize the interruption in viewing the recorded program.

While such "fast-forwarding" and "skip" operations focus the viewing experience on the audiovisual (television) program, they are detrimental to both the advertiser who is trying to reach potential customers and the broadcaster who depends upon advertising for revenue. As a result, there is a need for a system and method that allows advertisements to reach their intended viewer and protects the broadcaster's source of revenue.

BRIEF DESCRIPTION OF THE DRAWINGS

The present invention is illustrated by way of example, and not by way of limitation, in the figures of the accompanying drawings and in which.

DETAILED DESCRIPTION

In the following description, for the purposes of explanation, numerous specific details are set forth in order to provide a thorough understanding of the present invention. The following description provides exemplary embodiments of the invention, and the accompanying drawings show these various exemplary embodiments for illustrative purposes. However, these examples should not be construed in a limiting sense as they are merely intended to provide exemplary embodiments of the invention rather than to provide an exhaustive list of all possible implementations. In other instances, well-known structures and devices are not shown in block diagram form in order to avoid obscuring the details of the invention.

In the following description, certain terminology is used to describe features of the invention. For instance, the term "digital device" may refer to consumer electronic equipment that is adapted to perform one or more of the following operations on transmissions from a content provider: tune, receive, decrypt, descramble and/or decode. Examples of consumer electronic equipment may include, but are not limited or restricted to a television, a set-top box, a personal digital assistant (PDA), a computer, a telephone that is cellular or wireless enabled, a video game console, a portable or stationary music player, a personal video recorder (PVR), or the like. Also, examples of a "content provider" include, but are not limited or restricted to a terrestrial broadcaster, a cable or satellite television distribution system, or a company providing content for download over the Internet or other Internet Protocol (IP) based networks like an Internet Service Provider (ISP).

In certain situations, the terms "unit" and "logic" are representative of hardware, firmware and/or software configured to perform one or more functions. Examples of "hardware" include, but are not limited or restricted to an integrated circuit such as memory or a processor (e.g., a digital signal processor, microprocessor, application specific integrated circuit, a micro-controller, a type of programmable gate array, etc.). Of course, the hardware simply may be a collection of combinatorial logic.

An example of "software" includes executable code in the form of an application, an applet, a routine or even a series of instructions. The software may be stored in any type of machine readable medium such as a programmable electronic circuit, a semiconductor memory device such as volatile memory (e.g., random access memory, etc.) and/or non-volatile memory (e.g., any type of read-only memory "ROM", flash memory, etc.), a hard drive disk, a flash drive, a floppy diskette, an optical disk (e.g., compact disk or digital video disc "DVD"), magnetic tape, or the like.

I. Exemplary System/Device Architecture

Figure 1A:
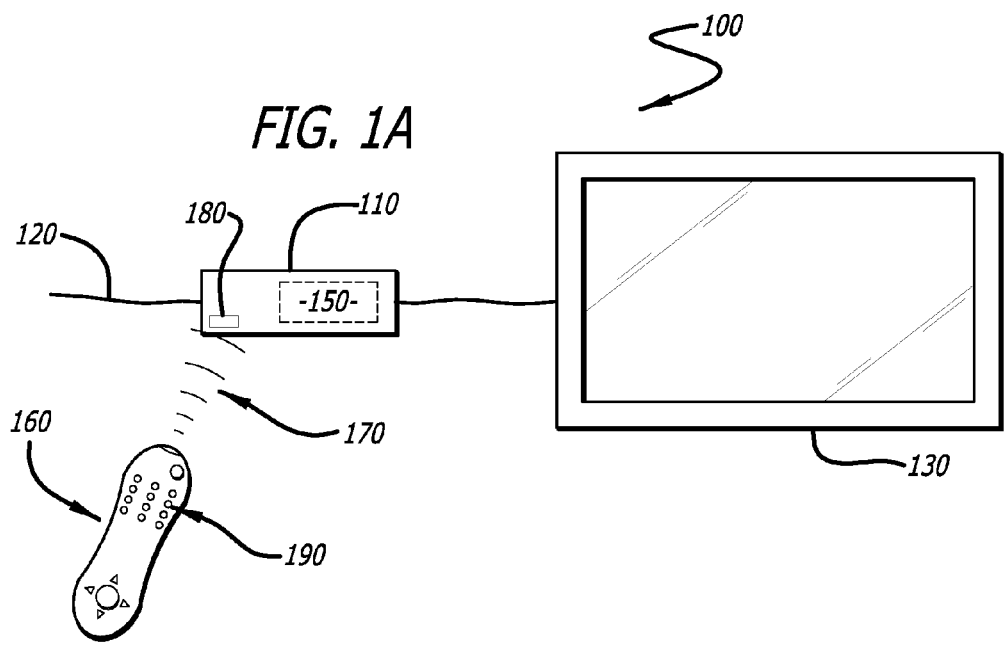
FIG. 1A is a first exemplary embodiment of a system implementing an advertisement control unit within a digital device.

Referring to FIG. 1A, a first exemplary embodiment of a content delivery system 100 implementing an advertisement control unit within a digital device is shown. One purpose of content delivery system 100 is to deliver content from a content provider to a targeted destination. This targeted designation includes a digital device 110 (e.g., set-top box, PVR, etc.) that is in communication with the content provider over an input link 120 to receive digital content that includes advertisements (e.g., video and/or audio) interspersed between segments of an audiovisual program. The advertisements may be delivered in the same channel as the audiovisual program. In fact, the advertisements may be delivered within the same data stream. Alternatively, of course, the advertisements may be delivered over a different channel than the channel used to deliver the audiovisual program.

According to this embodiment of the invention, digital device 110 is further coupled to a second digital device, such as a television 130 for example, that is adapted to display the content. Digital device 110 includes an advertisement control unit 150 that is adapted to, when applicable, select and substitute advertisements geared toward particular viewer(s) of television 130. Such substitution is based on heuristic information such as the "genre" of advertisements preferred by the viewer and perhaps feedback from the viewer of the displayed advertisements.

Being a wireless controller that is remotely located from digital device 110, a remote 160 controls the operations of advertisement control unit 150. Remote 160 is adapted to communicate commands through a communication link 170 established between remote 160 and digital device 110. In particular, according to this embodiment of the invention, the communication link 170 is a wireless light emitting diode (LED) communication path through which remote 160 sends commands that are formed as light pulses. These light pulses are detected by a LED detector 180 located on digital device 110. Alternatively, link 170 may be radio-frequency (RF) signaling or wireless signaling of other bandwidths where detector 180 constitutes an RF detector.

As shown, a particular command from remote 160 may be produced by depressing buttons 190 accessible on an outer top surface of remote 160. Buttons 190 may include a power button, a key of a keypad designating numerals and/or characters, a select button with multidirectional arrows that provide scrolling as needed, or the like.

Figure 1B:
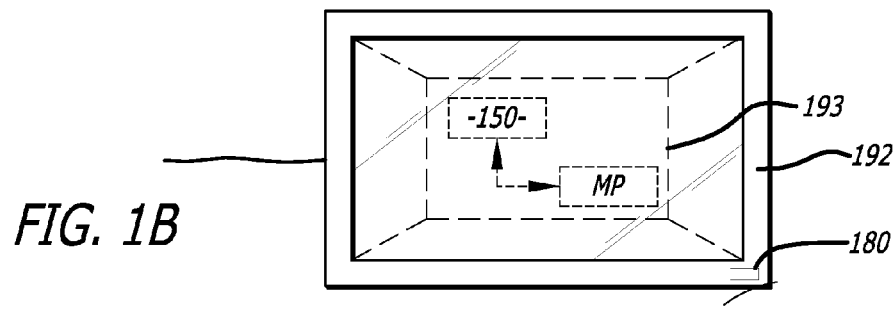
FIG. 1B is a second exemplary embodiment of a system implementing an advertisement control unit within a digital device.

Referring now to FIG. 1B, a second exemplary embodiment of content delivery system 100 implementing advertisement control unit 150 within digital device 110 is shown. Herein, digital device 110 is a device with a display screen 115. Similar to FIG. 1A, detector 180 is implemented within a casing 192 of digital device 110, namely a flat paneled television. Detector 180 detects signals from remote 160 and transfers those signals (e.g. commands) to a processor (MP) located on a back cabinet 193 of television 110. Herein, the processor receives the commands and issues appropriate signaling to advertisement control unit 150 in order to commence an advertisement playback process where one or more stored advertisements are retrieved and substituted for the broadcast advertisements interspersed between segments of the audiovisual program.

Figure 1C:
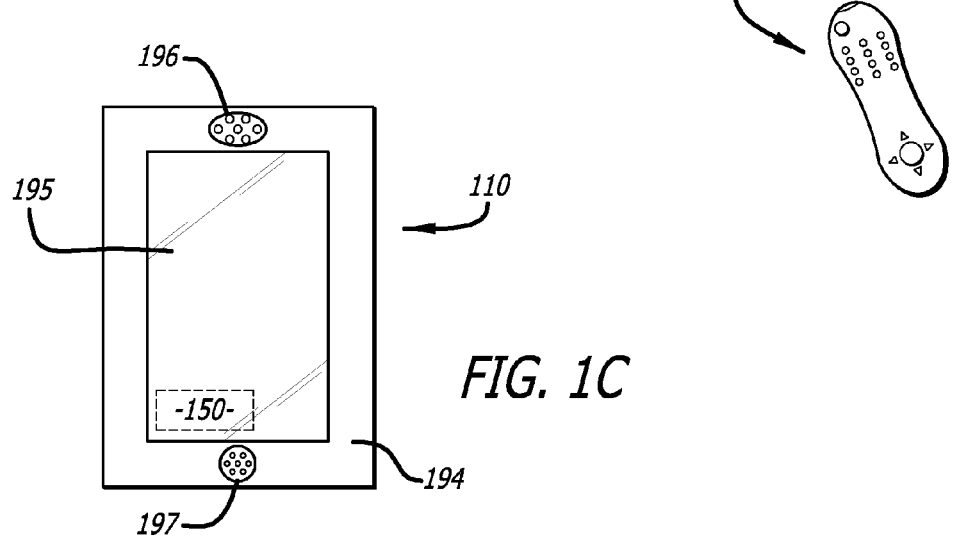
FIG. 1C is a second exemplary embodiment of a system implementing an advertisement control unit within a digital device.

Referring to FIG. 1C, a third exemplary embodiment of a system implementing advertisement control unit 150 within digital device 110 is shown. Herein, digital device 110 is portable with an integrated display. One example of portable digital device 110 is cellular telephone.

For this embodiment of the invention, cellular telephone 110 includes a casing 194, a user interface 195 (e.g. touch screen, keypad, etc.), a speaker 196 and a microphone 197. Herein, advertisement control unit 150 may be hardware, firmware and/or software such as a downloadable application that is executed by a processor implemented within casing 194 of cellular telephone 110. For that embodiment of the invention, advertisement control unit 150 either can be (i) prestored within local memory of telephone 110 at manufacturer, (ii) stored prior to distribution to the user, or (iii) downloaded into local memory by the user initiating communications with a remote source such as an application server. These communications may be over a private or public network to an application server hosted by any of the following: the cellular telephone service provider, the telephone manufacturer/distributor, or a third party.

According to one embodiment of the invention, upon being implemented within telephone 110, advertisement control unit 150 operates in the background by monitoring and substituting advertisements associated with audiovisual programs played back on telephone 110. Of course, it is contemplated that advertisement control unit 150 may operate in the foreground.

Figure 2:
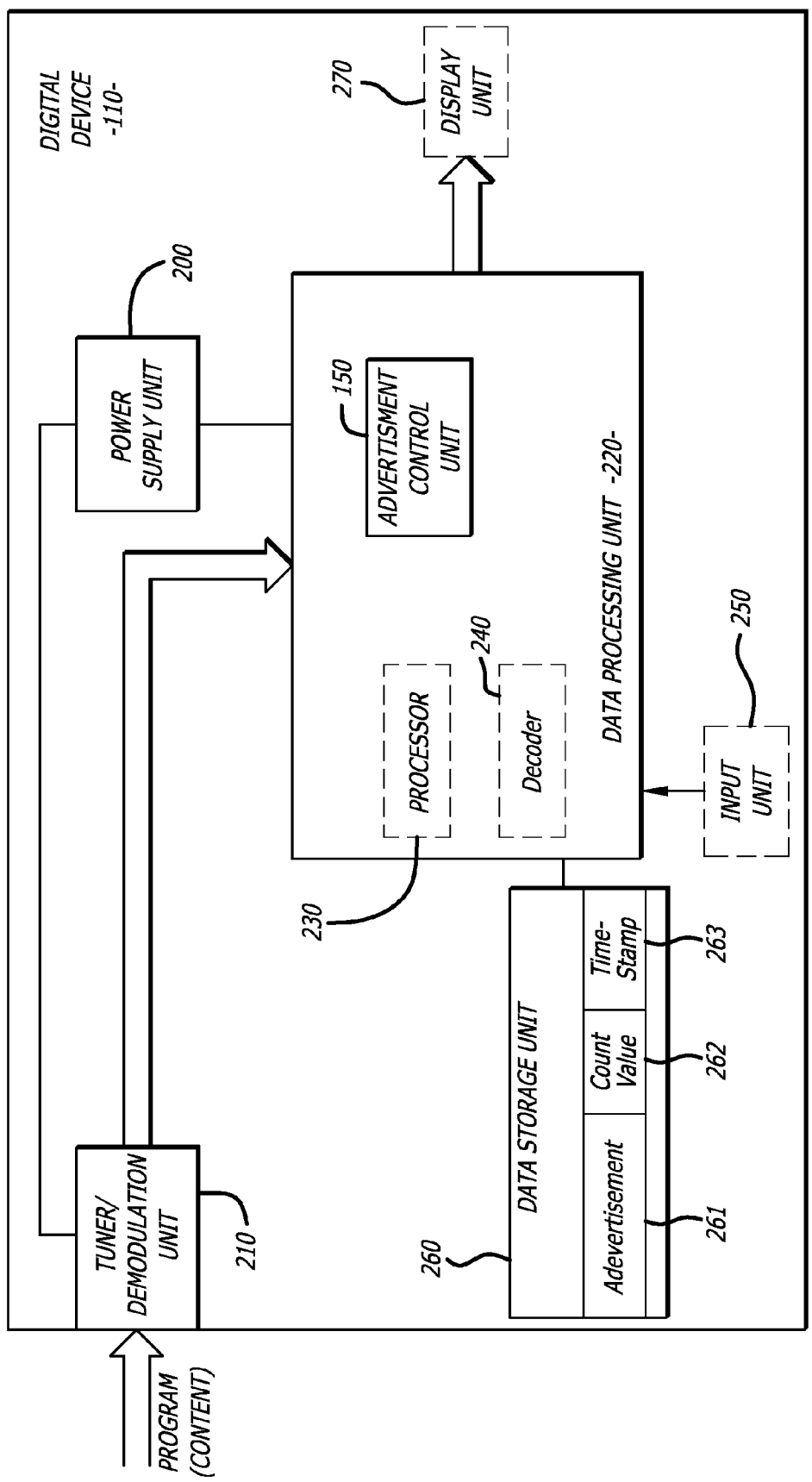
FIG. 2 is an exemplary embodiment of the digital device of FIG. 1C.

Referring now to FIG. 2, an exemplary diagram of an embodiment of digital device 110 of content delivery system 100 is shown. According to this embodiment of the invention, digital device 110 comprises a power supply unit 200, a tuner/demodulation unit 210 and data processing unit 220. According to this embodiment of the invention, power supply unit 200 is adapted to provide power to tuner/demodulation unit 210 and data processing unit 220. Power supply unit 200 may provide regulated power based on input power received from a wall socket (e.g., 110 volts alternating current "VAC", 220 VAC, etc.) or may include a battery implemented within digital device 110. Tuner/demodulation unit 210 tunes to one or more channels to receive incoming digital content and demodulates the content to recover the advertisements and the audiovisual program. The audiovisual program and the advertisements are routed as one or more digital bit streams to data processing unit 220.

According to one embodiment of the invention, data processing unit 220 comprises a processor 230 and/or a decoder 240. These components may be implemented as separate integrated circuits or as a single integrated circuit. As described herein, data processing unit 220 features logic operating to decode and process incoming information as well as advertisement control unit 150 that is adapted to control a registration process for each user of digital device 110 as well as, when necessary, to control and monitor the selection of advertisements that are stored within digital device 110 for subsequent playback during viewing of the audiovisual program. An input unit 250 may be implemented as an integral part of digital device 110 or may be separate and remotely located from digital device 110 (not shown). Similarly, display unit 270 may be implemented as an integral part of digital device 110 or may be separate and remotely located therefrom (not shown).

In general, according to one embodiment of the invention, advertisement control unit 150 is adapted to generate user interfaces for registration purposes and to substitute broadcast advertisements received with the audiovisual program with advertisements retrieved from a data storage unit 260. Data storage unit 260 operates as local memory for digital device 110 to store advertisements 261 along with a corresponding count value 262 and time stamp 263. Count value 262 may be adapted to either represent the number of times that the particular advertisement has been displayed or represent the number of times that advertisements for a particular genre of advertisements has been displayed. Time stamp 263 identifies the last time that the advertisement has been displayed. This information enables advertisement control unit 150 to alter the display frequency for that advertisement as needed.

According to one embodiment of the invention, the advertisement playback scheme supported by advertisement control unit 150 utilizes tags within the digital content in order to identify to advertisement control unit 150 what advertisements are to be retrieved from data storage unit 260. Alternatively, as shown for illustrative purposes, the advertisement playback scheme may involve data processing unit 220 accessing metadata within an Adaptation field of one or more Motion Picture Experts Group (MPEG) packets associated with the broadcast and/or stored advertisements.

For broadcast advertisements, the control information within the Adaptation field provides information to advertisement control unit 150 as to the genre (e.g., subject matter) of the advertisement. This metadata allows advertisement control unit 150 to determine whether the genre of the advertisement is authorized by the viewer for playback on display unit 270 and/or storage within data storage unit 260 for subsequent playback. Also, the control information identifies the allocated playback time period for the advertisement.

As described below, for stored advertisements, the control information within the Adaptation field also provides information to advertisement control unit 150 as to the genre of the advertisement. This metadata allows advertisement control unit 150 to determine whether the genre of the advertisement is authorized by the viewer for playback on display unit 270. The control information further identifies the allocated playback time period for the advertisement. The stored advertisements do not need to retain data as to whether storage is permitted.

II. Exemplary Content Stream Formats

Figure 3A:
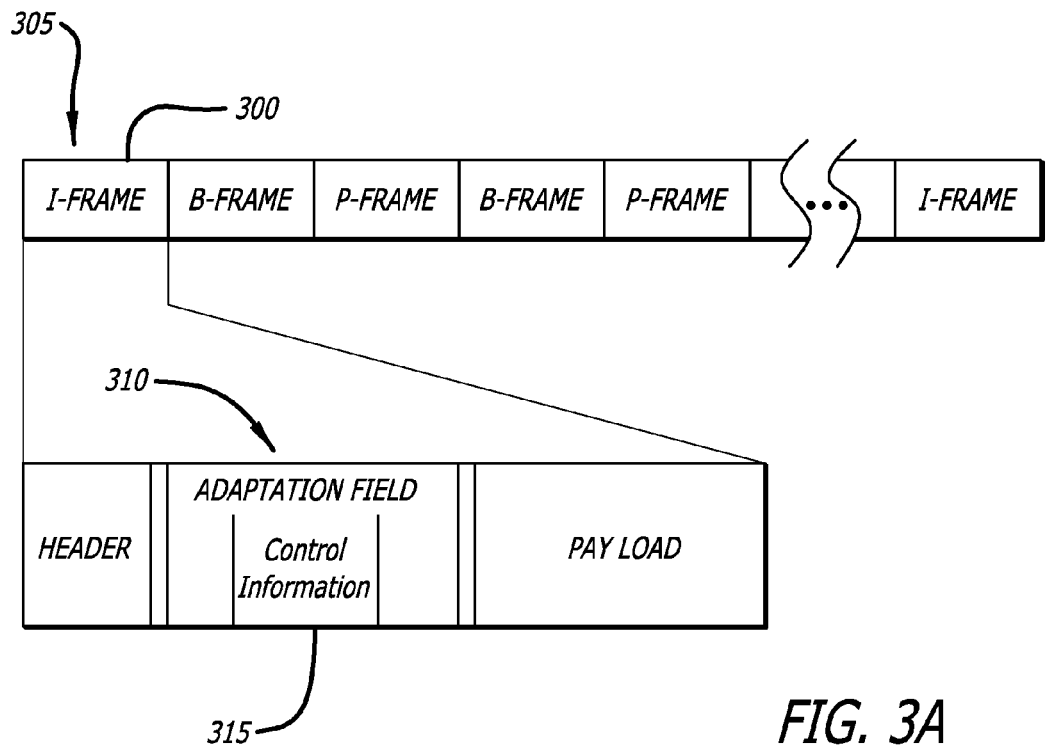
FIGS. 3A-3B are exemplary embodiments of the content stream format.

As shown in FIG. 3A, an exemplary diagram of an Adaptation field 310 of an I-frame 300 is shown. Adaptation field 310 is a portion of a MPEG packet 305 of a digital data stream, where according to this embodiment, MPEG packet 305 is associated with an advertisement to be displayed. Adaptation field 310 features control information 315 to indicate two or more of the following: (i) whether an advertisement playback feature is enabled; (ii) the genre of the advertisement; (iii) whether the broadcast advertisement can be stored; and (iv) the allocated playback period for the advertisement.

More specifically, according to this particular embodiment of the invention, adaptation field 310 comprises control information 315 that includes at least one bit to indicate whether the advertisement playback feature is enabled. This enables the digital device to operate in two or more modes, where at least one mode is designed to prevent playback alteration of the advertisement through such actions as fast-forwarding, skipping, pausing, or muting. For instance, when control information 315 includes three bits, the digital device may operate in eight or less operating modes as set forth below in Table A. Of course, more bits may be utilized to support a greater number of operating modes.

TABLE A

| MODE | FAST-FORWARDING | SKIP | MUTE | PAUSE |
|---|---|---|---|---|
| 0 | Permitted at all rates > normal playback rate | Permit | Permit | Permit |
| 1 | Permitted at all rates > normal playback rate | Prohibit | Permit | Permit |
| 2 | Permitted at all rates > normal playback rate | Permit | Prohibit | Permit |
| 3 | Permitted at all rates > normal playback rate | Permit | Permit | Prohibit |
| 4 | Prohibited at rate ≥30 times normal playback rate (30X FF) | Prohibit | Prohibit | Prohibit |
| 5 | Prohibited at rates ≥16 times normal playback rate (16X & 30X FF) | Prohibit | Prohibit | Prohibit |
| 6 | Prohibited at rates ≥8 times normal playback rate (8X, 16X & 30X FF) | Prohibit | Prohibit | Prohibit |
| 7 | Prohibited at rates ≥2 times normal playback rate (2X, 8X, 16X &30X FF) | Prohibit | Prohibit | Prohibit |

Figure 3B:
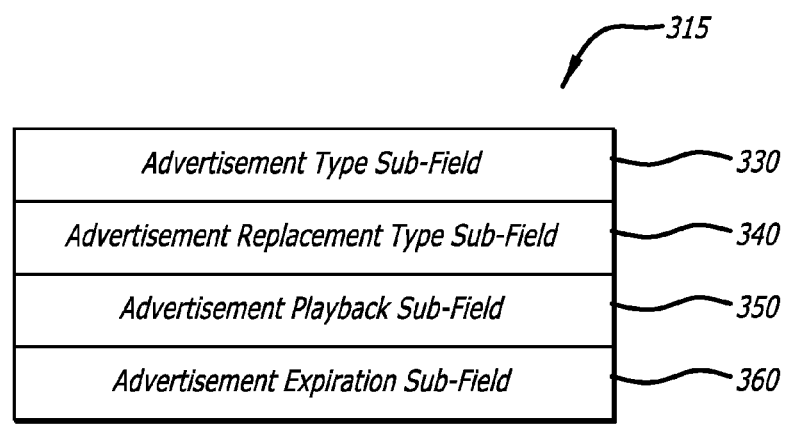

As set forth in FIG. 3B, control information 315 of Adaptation header 310 comprises a plurality of sub-fields, including but not limited or restricted to one or more of the following: (1) an advertisement type sub-field 330; (2) an advertisement replacement type sub-field 340; (3) an advertisement playback sub-field 350; and (4) an advertisement expiration sub-field 360.

Advertisement type sub-field 330 identifies the genre of advertisement intended for display. This information may be used by advertisement control unit 150 of FIG. 2 to select various types of replacement advertisements, if advertisement replacement is supported.

Advertisement replacement type sub-field 340 identifies a type of advertisement replacement scheme that are available for use by the advertisement control unit in response to detection of an alteration in the playback of the advertisement (e.g., pause, mute or accelerated playback such as fast-forwarding or skipping). For instance, in response to a particular action to alter the playback of an advertisement, such as an action to reduce the viewing time of the advertisement (e.g., ×30 FF or skip), the advertisement control unit may substitute the broadcast advertisement with a pre-stored advertisement classified as part of a genre selected by the user. Alternatively, the advertisement control unit may cause the digital device to operate in an abbreviated mode in which one or more partial-length advertisements or static images are substituted for the broadcast advertisement(s). An "abbreviated" advertisement has a display time that is normally 2-10 seconds in duration.

Advertisement playback sub-field 350 identifies whether the advertisement playback feature is enabled, where there may be restrictions against altering of a broadcast advertisement (e.g., fast-forwarding, skipping, pausing, muting, etc.), and if so, to what degree are such alterations permitted as shown above in Table A.

Advertisement expiration sub-field 360 is a value that represents the playback time in which the advertisement is permitted to be displayed. This playback time may be a time frame that is selected by the advertiser in accordance with the commercial longevity of the product and/or services identified in the stored advertisement. For instance, an advertisement for a Fourth of July sale may feature a playback time that is set to elapse on July $5^{th}$ or July $4^{th}$ at a certain time of day (e.g., 4:00 PM on July $4^{th}$). This sub-field 360 is optional for broadcast advertisements that are not permitted to be stored within the data storage unit and used for subsequent display.

For those advertisement that are stored with the digital device for subsequent playback, in response to an action that alters playback of a broadcast advertisement, a stored advertisement is selected and the playback time, which is represented by the value within sub-field 360, is compared with the real-time clock before playback. If the comparison results in a determination that the playback has elapsed, a different stored advertisement within the same genre or another preferred genre is selected and the comparison operation is repeated. Otherwise, the selected stored advertisement is configured for display.

III. Exemplary Registration Process

Figure 4A:
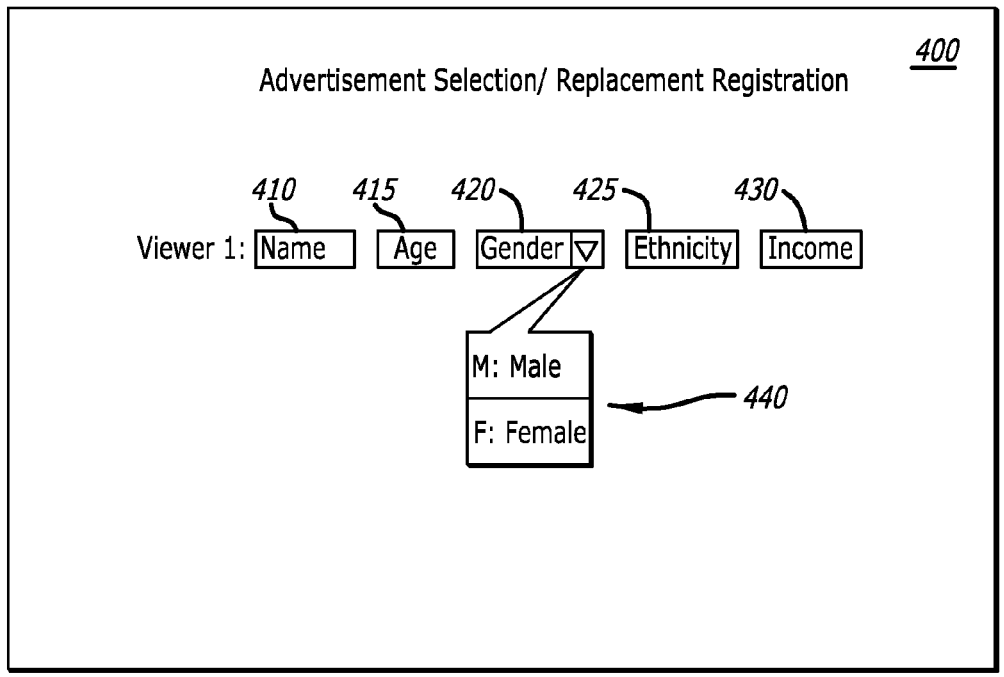
FIG. 4A is an exemplary embodiment of a user interface produced by the advertisement control unit of the digital device to commence registration of one or more viewers.

Referring to FIG. 4A, an exemplary embodiment of a user interface produced by advertisement control unit 150 of digital device 110 of FIG. 2 to commence registration of one or more viewers is shown. Herein, a registration image 400 is displayed by digital device 110 in order to allow the viewer or viewers to provide personal information. Herein, a viewer can use a remote or keypad associated with digital device 110 in order to enter alphanumeric characters that will provide some or all of the following information concerning the viewer(s): (1) name 410; (2) age 415; (3) gender 420; (4) ethnicity 425; and (5) income level 430.

For some of the viewer-based information, pull-down menus may be provided to allow the viewer to select the appropriate entry. For instance, as shown, a pull-down menu 440 may be provided with two entry selections: male "M" and female "F". Additionally, pull-down menus may be provided for some of the other categories such as age, ethnicity, and income level. The "name" category however will most likely be input by the viewer via buttons on a remote or those associated with a digital device or an input mechanism integrated on digital device 110 such as a keypad, a touch screen, or the like.

Figure 4B:
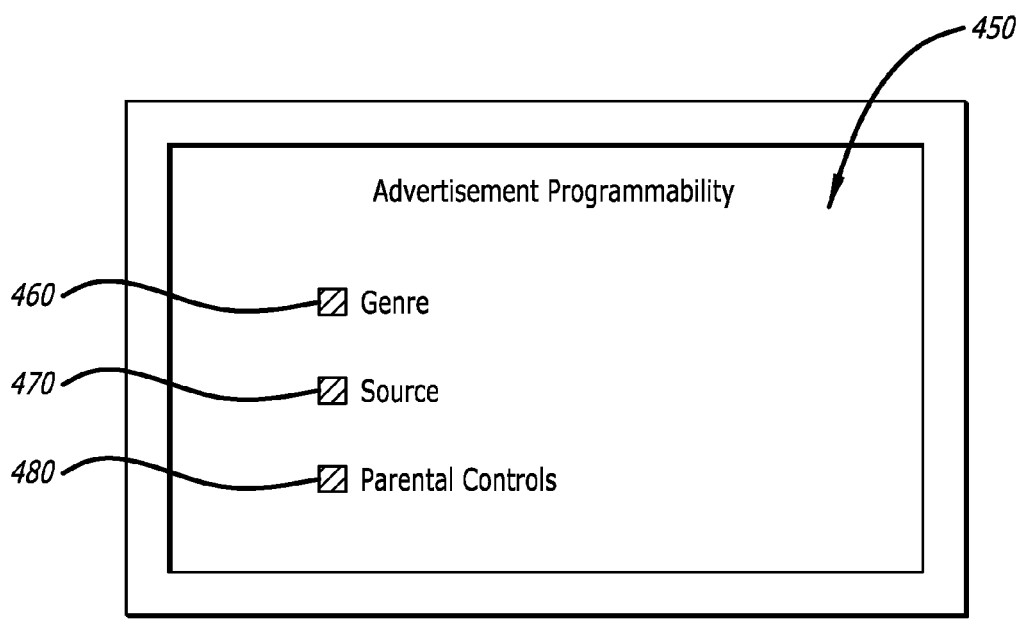
FIG. 4B is an exemplary embodiment of a user interface produced by the advertisement control unit of the digital device to program the preferred advertisements for a first viewer.

Referring now to FIG. 4B, an exemplary embodiment of a user interface 450 produced by the advertisement control unit of the digital device to program the preferred advertisements for a first viewer is shown. Herein, user interface 450 provides a plurality of parameters for use in selecting preferred advertisements. For instance, as an example, these parameters include, but are not limited or restricted to a genre parameter 460, a source parameter 470 and a parental control parameter 480.

Genre parameter 460 is used to identify particular types of advertisements that the viewer would like to see interspersed between television programming. Source parameter 470 provides information from where the digital device is to retrieve the advertisements. Parental control parameter 480 provides a mechanism to exclude certain types of advertisements from being displayed on the digital device. For instance, the parental controls may be viewer specific to exclude the displaying of a type of advertisement when a particular viewer is watching or may be generally applied to excluding this type of advertisement from being displayed on the digital device.

Figure 5A:
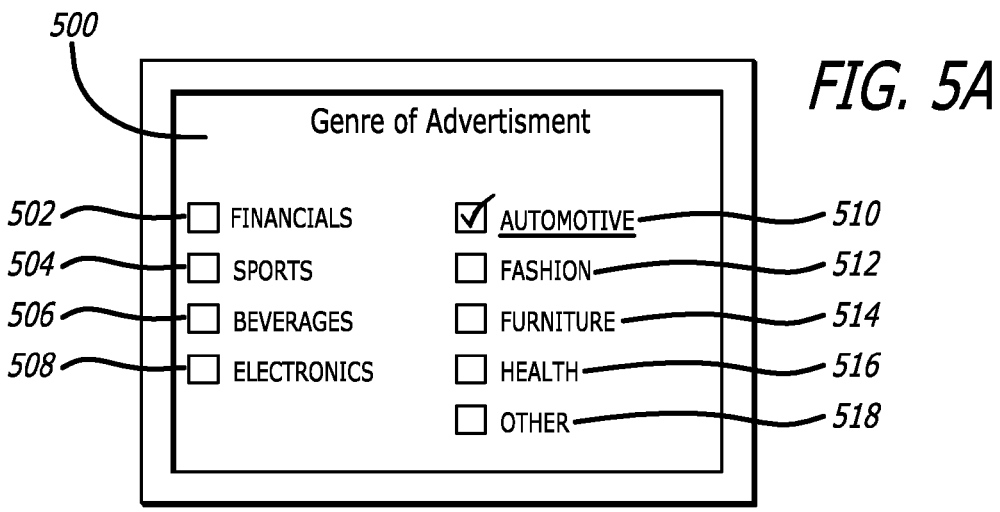
FIGS. 5A-5C are exemplary embodiments of the user interfaces produced by the advertisement control unit of the digital device to program the preferred genre for the advertisements.
Figure 5B:
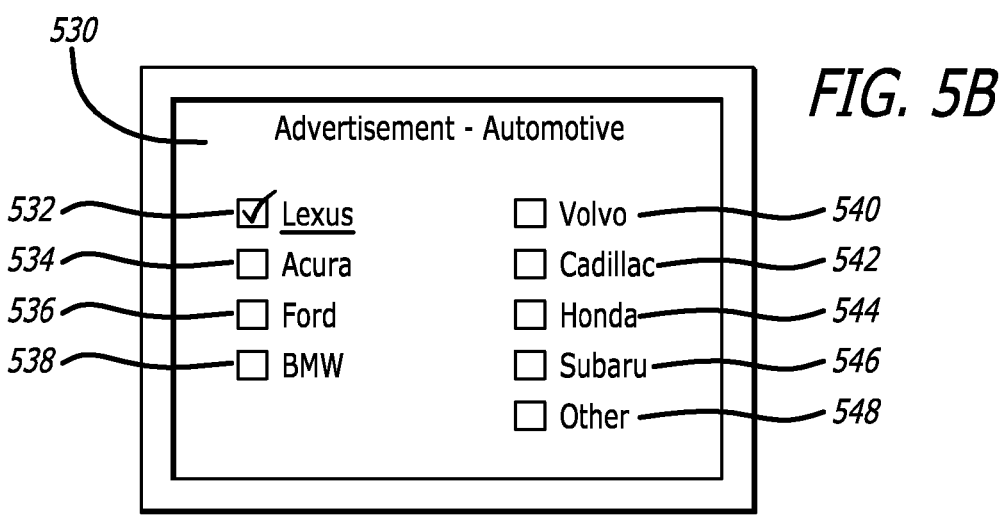
Figure 5C:
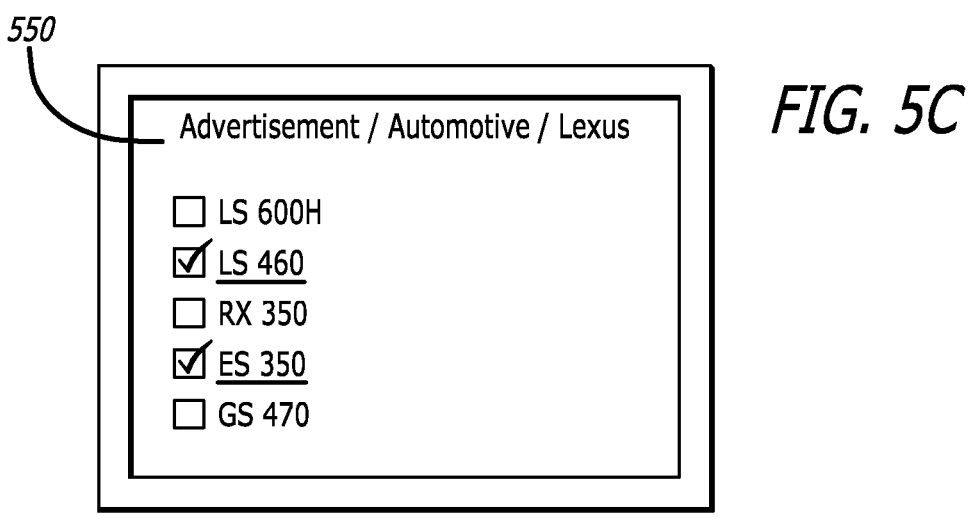

Referring now to FIGS. 5A-5C, exemplary embodiments of selectable user interfaces produced by the advertisement control unit of the digital device in order to program the preferred genre of the advertisements is shown. Herein, FIG. 5A illustrates a first user interface 500 of advertisement genre that is selectable by the viewer. According to this embodiment of the invention, the advertisement genre includes, but is not limited or restricted to financials 502, sports 504, beverages 506, electronics 508, automotive 510, fashion clothing 512, furniture 514, health 516 and other 518. Herein, the viewer selects the genre of advertisements that he or she would be willing to watch in full or in an abbreviated mode in order to customize the advertisement viewing for that particular user.

According to one embodiment of the invention, at least one genre is required to be selected before proceeding to the next user interface of the advertisement selection scheme. Herein, the beverage and automotive categories 506 and 510 are selected by the viewer. In event that the "other" category 518 is selected, another selectable user interface (e.g., screen display) with additional advertisement genres is displayed for the viewer to choose different categories for this particular genre.

Of course, in lieu of selecting the particular genres that are acceptable to the viewer, interface 500 may be adapted so that all of the genre categories are selected. Now, the viewer would need to deselect the particular genre category or categories that he or she does not want to view.

Referring to FIG. 5B, a second user interface 530 is provided which provides greater granularity as the particular types of automotive advertisements that would be available to the viewer. Herein, according to one embodiment of the invention, the automotive advertisements are categorized according to the make of a particular type of automotive vehicle such as, for example, Lexus® 532, Acura® 534, Ford® 536, BMW® 538, Volvo® 540, Cadillac® 542, Honda® 544, Subaru® 546 and Other 548. According to another embodiment for this user interface, the automotive advertisements may be categorized according to make/model of these automotive vehicles.

In the event that the viewer selects one of the "make" categories illustrated in FIG. 5B, such as the Lexus® category for example, an additional user interface 550 is provided as shown in FIG. 5C. Of course, user interface 550 may be produced automatically or in response to selection of an entry (not shown). As shown, for this embodiment of the invention, user interface 550 is a selectable screen display that allows the user to select the particular "model" of the vehicle for which advertisements will be played back for the viewer. For this illustrative example, Lexus® LS460 and Lexus® ES350 sedans are selected.

If none of the vehicle models are selected, all Lexus® models will be selected by default in order to comply with the viewer's request for Lexus® advertisements in user interface 530 of FIG. 5B. Similarly, for the automotive "makes" set forth in FIG. 5B, in the event that none of these are selected by the viewer, the advertisement control unit enters into a default state where all automotive makes are selected in order to comply with the viewer's request for automotive advertisements in user interface 500 of FIG. 5A.

Figure 6A:
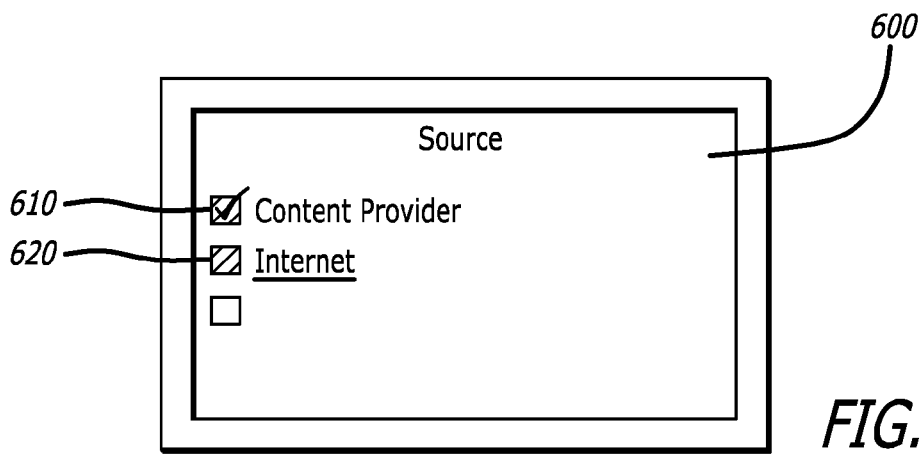
FIGS. 6A and 6B are exemplary embodiments of user interfaces that allow the viewer to select the particular source upon which the advertisements may be extracted.
Figure 6B:
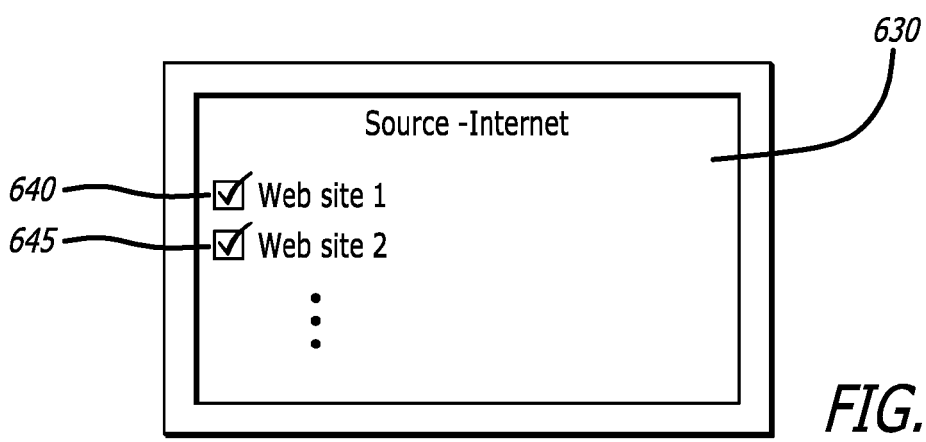

Referring now to FIGS. 6A and 6B, user interfaces 600 and 630 are shown in order to allow the viewer to select the particular source upon which the advertisements may be extracted. As shown in FIG. 6A, user interface 600 displays the sources from which advertisements can be recovered or obtained. These sources may include, but are not limited or restricted to a particular content provider 610 or various websites accessible over the Internet 620. Upon selecting advertisements from the content provider, advertisements periodically may be uploaded to the digital device therefrom and stored in local memory for subsequent retrieval. The periodicity of the uploading may be on a daily basis or with greater periodicity such as on an hourly basis.

Upon selecting the Internet parameter, user interface 630 is generated, which is illustrated as a screen display that lists websites 640 and 645 from which the advertisements may be downloaded. These websites 640 and 645 may be dedicated websites for particular advertisers or websites of particular content providers or broadcasters. Alternatively, the websites may be a video based website from which revenue could be realized by the broadcasters from advertisements extracted from that particular website.

Figure 7:
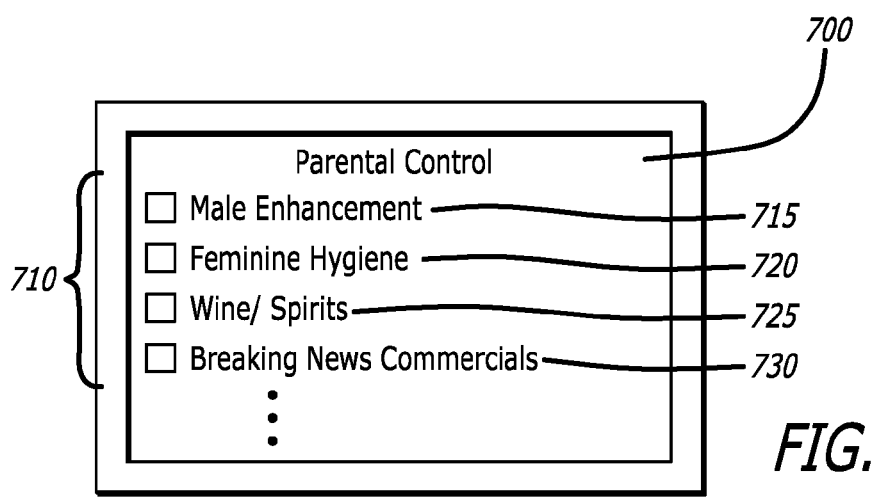
FIG. 7 is an exemplary embodiment of the user interface produced by the advertisement control unit of the digital device to preclude certain genre of advertisements for particular viewers.

Referring now to FIG. 7, an exemplary embodiment of the parental control user interface 700 is shown. Herein, various adult-oriented genres 710 are listed to enable a guardian of the viewer to select particular genres or advertisement categories that the viewer should not be allowed to view. For instance, such categories may include, for example, male enhancements 715, feminine hygiene products 720, wine & spirits 725, breaking news commercials 730 which are normally geared toward sensationalism, and the like. By selecting any of "parental control" genre, the advertisement control unit prevents such genre from being displayed.

Figure 8A:
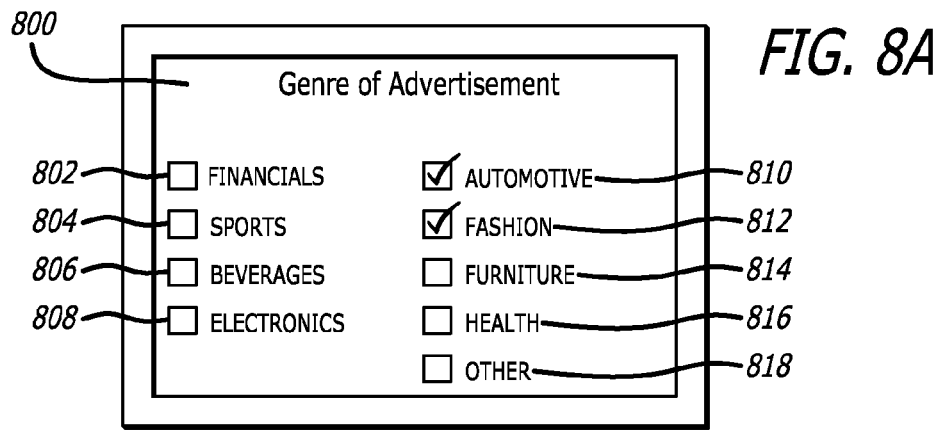
FIGS. 8A-8C are exemplary embodiments of user interfaces produced by the advertisement control unit of the digital device to provide preference ratings for the advertisements.
Figure 8B:
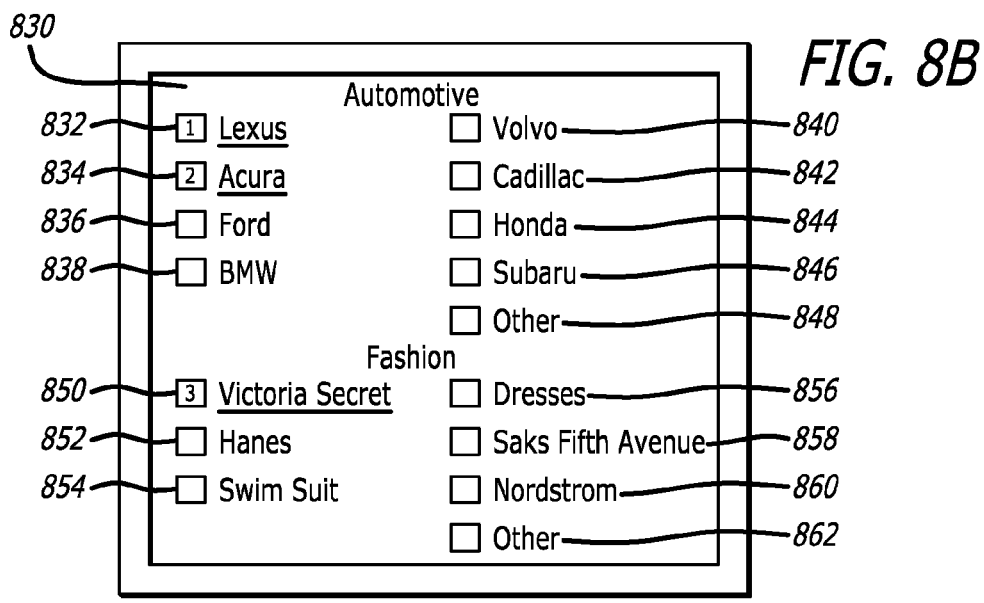
Figure 8C:
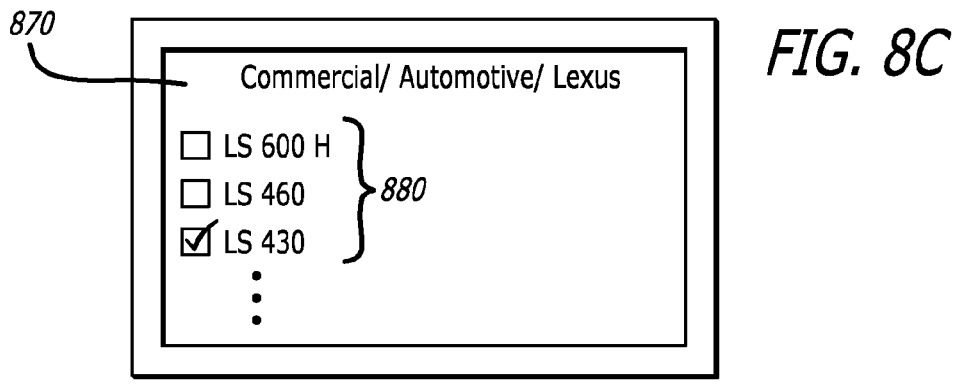

Referring now to FIGS. 8A-8C, exemplary embodiments of selectable user interfaces produced by the advertisement control unit of the digital device in order to program the preferred genre of the advertisements according to a rating scheme is shown. Herein, FIG. 8A illustrates a first user interface 800 of advertisement genre that is selectable by the viewer. According to this embodiment invention, the advertisement genre includes, but is not limited or restricted to financials 802, sports 804, beverages 806, electronics 808, automotive 810, fashion 812, furniture 814, health 816 and other 818. Herein, the viewer selects the genre of advertisements that he or she would be willing to watch in full or abbreviated mode in order to customize the advertisement viewing for that particular user.

According to one embodiment of the invention, at least one genre is required to be selected before proceeding to the next segment of the advertisement selection scheme. Herein, the automotive and fashion categories 810 and 812 are selected by the viewer. As previously described, in event that an "other" category 818 is selected, another user interface (e.g., screen display) with additional advertisement genres is displayed for the viewer to select different categories for this particular genre. Alternatively, in lieu of selecting the particular genres that are acceptable to the viewer, user interface 800 may be adapted so that all of the genre categories are selected. Now, the viewer would need to deselect the particular genre category or categories that he or she does not want to view.

Referring to FIG. 8B, a second user interface 830 is provided which provides greater granularity as to the particular types of automotive and fashion advertisements that are acceptable to the viewer. Herein, according to one embodiment of the invention, the automotive advertisements are categorized according to the make of a particular type of automotive vehicle such as, for example, Lexus® 832, Acura® 834, Ford® 836, BMW® 838, Volvo® 840, Cadillac® 842, Honda® 844, Subaru® 846 and Other 848. The fashion advertisements are categorized according to clothing maker, clothing type and/or store such as Victoria Secret® 850, Hanes® 852, swimsuit 854, dresses 856, Saks Fifth Avenue 858, Nordstrom 860, and other 862.

Instead of selecting the categories, the viewer can use the remote or input device to provide preference ratings for each of these categories. For instance, according to this example, Lexus® and Acura® advertisements are rated "1" and "2" by depressing a corresponding numeral on the keypad of the remote while Victoria Secret advertisements was rated "3". Further granularity of advertisements may be provided as described above, where each category provides sub-categories for the user to select.

As shown in FIG. 8C, for this embodiment of the invention, user interface 870 is a selectable screen display that allows the user to select the particular "model" 880 of the vehicle for which advertisements will be played back for the viewer. If none of the vehicle models are selected, all Lexus® models will be selected by default in order to comply with the viewer's request for Lexus® advertisements in user interface 830 of FIG. 8B.

Figure 9A:
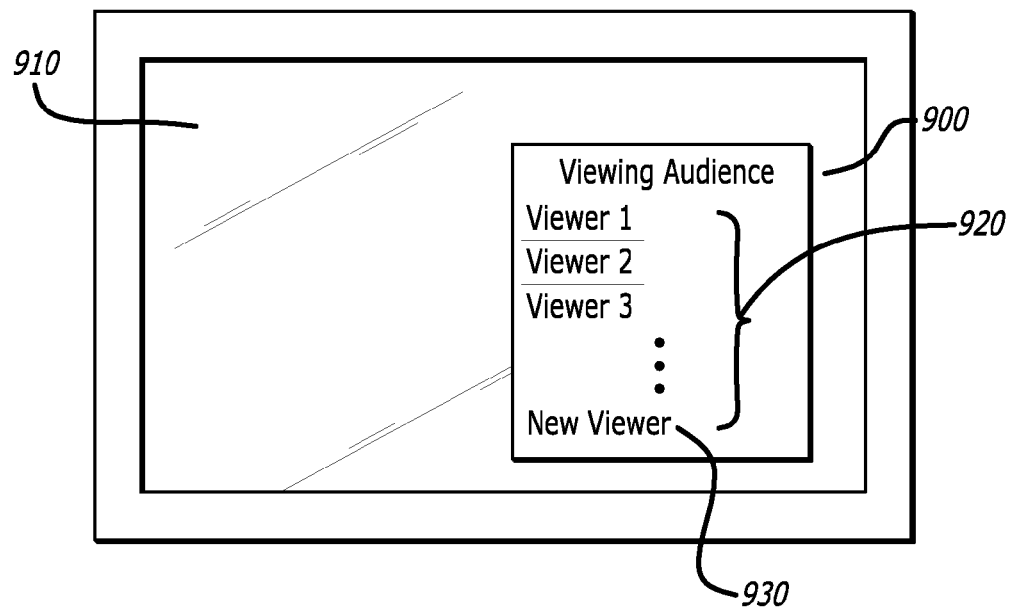
FIGS. 9A-9B are exemplary embodiments of a user interface used to determine the current viewing audience.

Referring now to FIG. 9A, after a viewer has registered his or her advertisement preferences, the advertisement control unit provides a control panel that identifies which registered viewer(s) is(are) currently watching the program. According to this embodiment of the invention, a control panel 900 is superimposed over an audiovisual program 910 that is being watched. Control panel 900 is used to determine the current viewing audience in order to provide appropriate controls signals to the advertisement control unit for advertisement selection.

Herein, control panel 900 includes one or more selectable entries 920 that are each associated with a registered viewer and designate which of the registered viewers form the viewing audience. An additional entry 930, when selected, begins registration of a new viewer. Upon selection of an entry associated with a registered viewer, the advertisement control unit is provided information that the registered viewer is part of the viewing audience. Hence, the advertisements will be tailored to the viewing audience. Control panel 900 may be displayed at initial power-on of the digital device and may be intermittently displayed automatically or in response to commands initiated by the viewer via the remote or a panel located on the digital device itself.

In the event that the viewing audience is identified as consisting of multiple registered viewers, the advertisement control unit determines if there is a subset of advertisements that are preferred by the entire viewing audience. In the event that the viewers substantially differ in advertisement preferences, and thus no subset can be computed, the advertisement control unit selects those advertisements that are preferred by any of the registered users. The advertisements may be pseudo-randomly selected or may be selected according to a particular pattern. For instance, the advertisements may be intermixed so that the first advertisement is of a genre preferred by the first viewer while the second advertisement is of a genre preferred by the second viewer, and the like.

If parental controls are in place for at least one of the viewers or for the digital device in general, the genre of advertisements that have been disallowed from viewing will not be shown, even if one of the viewers has such advertisements as part of his or her preferences. Besides mere selection of entries by the viewers, passwords may be required where parental controls are in effect.

Control panel 900 may also be used to remove a registered viewer from the viewing audience by deselecting the viewer who now will not be part of the viewing audience. As an example, this would remove a designation (e.g. underline, highlight, etc.) from the viewer's listed name. As a result, the advertisements may be specifically tailored to the remaining viewer(s).

Of course in lieu of viewer registration, it is contemplated that the registration process could be directed toward a category of users such as "adults" and "minors" for instance. In this situation, the viewer can be tailored to a broad category of viewers.

Figure 9B:
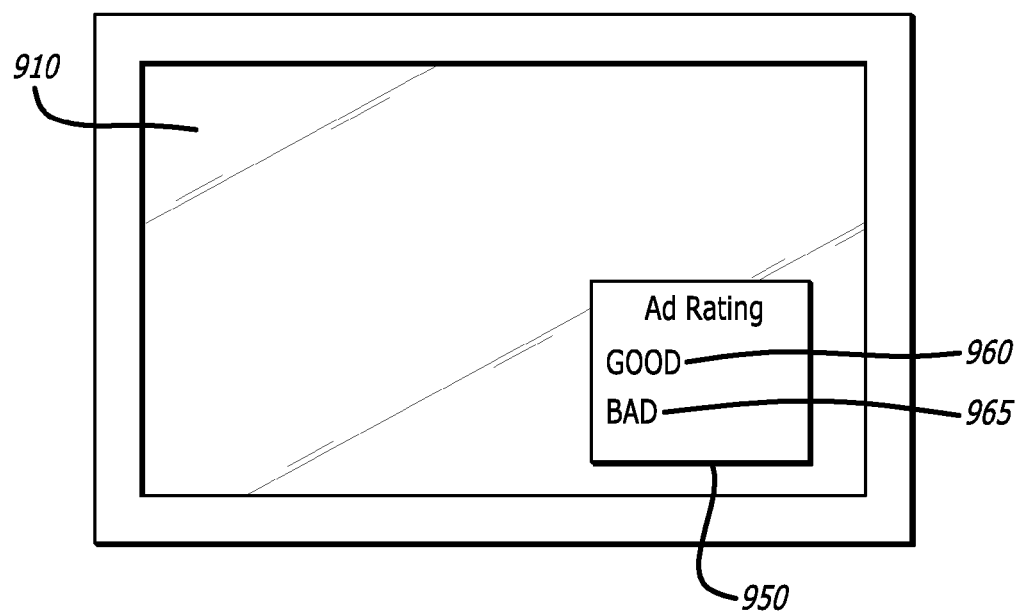

Referring to FIG. 9B, after a viewer has registered his or her advertisement preferences, the advertisement control unit may also be signaled to provide a control panel 950 that enables one or more registered viewers currently watching the audiovisual program to rate the displayed advertisements. For example, control panel 950 may be initiated for display by the viewer through a command transmitted to the digital device via a remote. A simple commercial review process may simply indicate that the advertisement was good ("1") 960 or bad ("0") 965. Of course, a more complex review process may be implemented that enables the viewer to provide a rating 1-10 or 1-100 for the advertisement, where one end of the range indicates a complete lack of viewing enjoyment while another range indicates full enjoyment in viewing the advertisement.

IV. Exemplary Heuristic Advertisement Replacement Scheme

Figure 10:
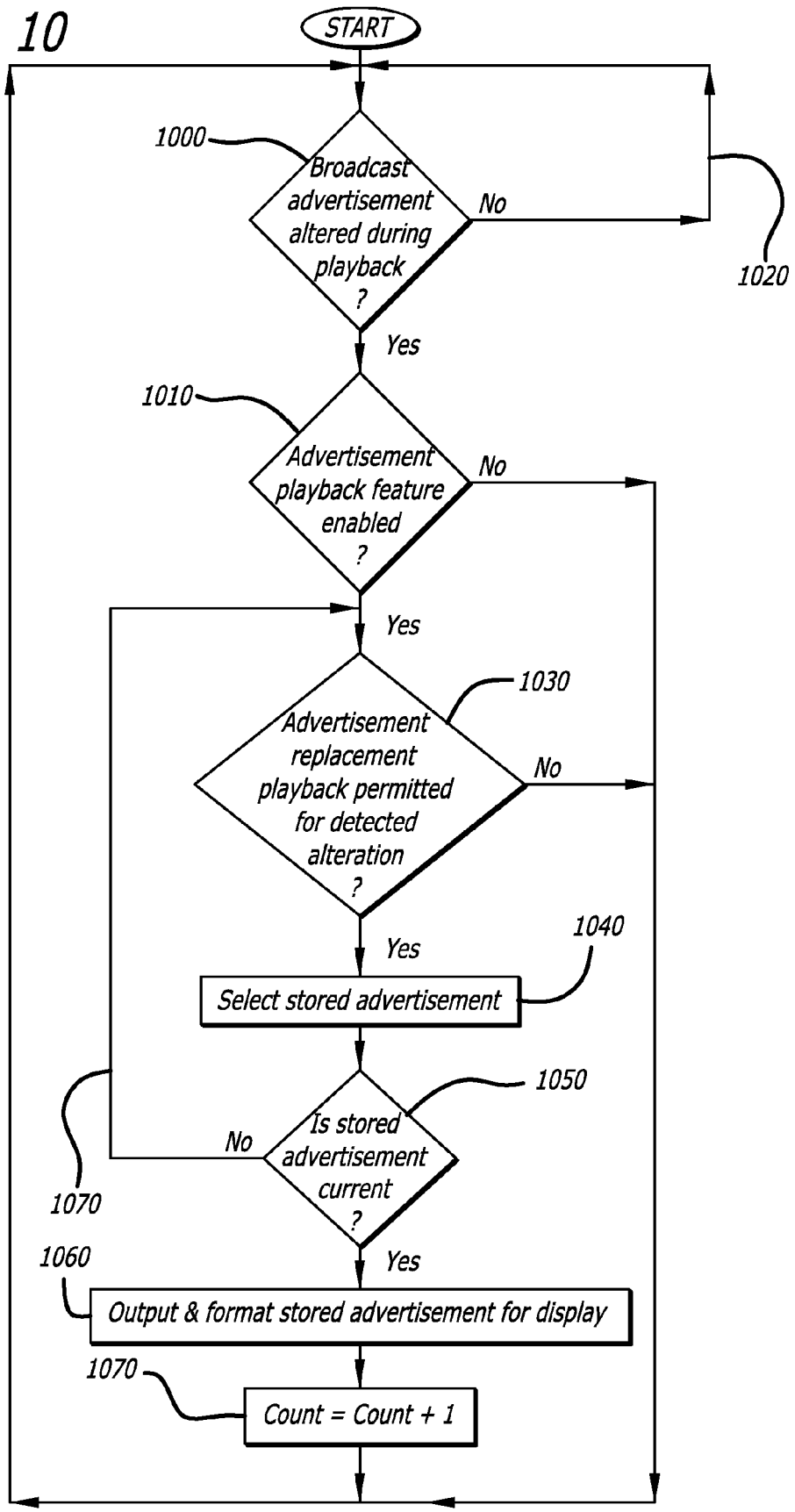
FIG. 10 is an exemplary embodiment of a flowchart highlighting the selection of stored advertisements based on heuristic information and an action that alters playback of the broadcasted advertisement.

Referring now to FIG. 10, an exemplary embodiment of a flowchart highlighting the selection of stored advertisements based on heuristic information and an action that alters playback of the broadcasted advertisement is shown. First, a determination is made whether a broadcast advertisement is being altered during playback (item 1000). This determination can be made by the advertisement control unit monitoring whether a fast-forward, pause, mute or skip command has been received during playback of the broadcast advertisement. If so, a determination is made whether the advertisement playback feature is enabled, and thus, may impose restrictions against the altering of the advertisement during playback (item 1010). Otherwise, the advertisement control unit continues to monitor for alterations during playback of advertisements (item 1020).

In response to a determination that a broadcast advertisement is being altered during playback and the advertisement playback feature is enabled, a stored advertisement is selected according to heuristic information such as, for example, the highest genre preference ratings (if rating are used) or according to a preferred genre identified by at least one of the viewers (item 1030). This heuristic information also may include (i) a count value indicating the number of times that the advertisement has been selected, and/or (ii) a time-stamp value indicating the last time the stored advertisement was displayed, and/or (iii) any feedback received from the reviewer after prior displays of the advertisement.

After the stored advertisement is selected, a determination is made whether the advertisement is current (item 1040). This may involve a determination as to whether a playback period for the advertisement has elapsed. If not, the advertisement is output for formatting and subsequent display (item 1050) and a count value is incremented to denote playback of the stored advertisement (item 1060). However, if the advertisement is not current, another stored advertisement is selected and is determined if it is current (item 1070).

Having disclosed exemplary embodiments and the best mode, modifications and variations may be made to the disclosed embodiments while remaining within the spirit of the invention as defined by the following claims.

What is claimed is:

1. An apparatus comprising:
   a computer memory that is not a transitory signal and that includes instructions executable by at least one processor to:
   receive advertisements from a broadcast source;
   receive first control information for a first advertisement indicating that fast forwarding through the first advertisement is permitted at all rates of fast forward, skipping the first advertisement is permitted, muting first advertisement volume is permitted, and pausing the first advertisement is permitted;
   receive second control information for a second advertisement indicating that fast forwarding through the second advertisement is permitted at some but not all rates of fast forward, skipping the second advertisement is not permitted, muting second advertisement volume is not permitted, and pausing the second advertisement is not permitted;
   receive third control information for a third advertisement indicating that fast forwarding through the third advertisement is permitted at all rates of fast forward, skipping the third advertisement is permitted, muting third advertisement volume is not permitted, and pausing the third advertisement is permitted;
   control playback of the first, second, and third advertisements according to the first, second, and third control information.

2. The apparatus of claim 1 further comprising the display coupled to the processor and the processor displaying an advertisement upon detecting a permitted operation that alters playback.

3. The apparatus of claim 1 being a portable cellular telephone with the computer memory and the processor encased within a casing and display integrated as part of the casing.

4. The apparatus of claim 1 being a television including a detector to receive a command remotely and to send a signal associated with the command to the processor located within a back cabinet of the television situated behind the display.

5. The apparatus of claim 1 being a set-top box that receives digital content including an audiovisual program and a plurality of broadcast advertisements interspersed between segments of the audiovisual program and substitutes one of a plurality of stored advertisements in response to the processor detecting the operation that is a fast-forwarding operation being conducted on the one of the plurality of broadcast advertisements.

6. The apparatus of claim 1, wherein the instructions are executable to:
select an advertisement for presentation based on heuristic information maintained for each of a plurality of advertisements, wherein the heuristic information, used by the processor to select the one of the advertisements stored within the computer memory, further includes feedback from the viewer for the one of the advertisements.

7. The apparatus of claim 1, wherein a selection of an advertisement is conducted by logic within the apparatus and is based on heuristic information maintained for each of a plurality of advertisements, wherein the heuristic information, used by the processor to select the advertisements, further includes a rating for each genre of advertisement selected by a viewer.

8. The apparatus of claim 1, wherein a selection of an advertisement is conducted by logic within the apparatus and is based on heuristic information maintained for each of a plurality of advertisements stored within the computer memory, the heuristic information, used by the processor to select the one of the advertisements stored within the computer memory, further includes a count value indicating the number of times that each of the plurality of advertisements stored in the computer memory has been selected.

9. The apparatus of claim 1, wherein the logic further determines whether a playback period for an advertisement has elapsed, and responsive to determining that the playback period has elapsed, selects another advertisement for subsequent determination as to whether the another advertisement is current with a playback period that has not elapsed.

10. A method comprising:
receiving digital content by a digital device, the digital content including segments of an audiovisual program separated by at least one broadcast advertisement;
in response to control information received in the broadcast content, determining an operation to be performed relative to the broadcast advertisement, the control information indicating;
first control information for a first advertisement indicating that fast forwarding through the first advertisement is permitted at all rates of fast forward, skipping the first advertisement is not permitted, muting first advertisement volume is permitted, and pausing the first advertisement is permitted;
second control information for a second advertisement indicating that fast forwarding through the second advertisement is permitted at all rates of fast forward, skipping the second advertisement is permitted, muting second advertisement volume is permitted, and pausing the second advertisement is not permitted;
third control information for a third advertisement indicating that fast forwarding through the third advertisement is not permitted at any rate of fast forward, skipping the third advertisement is not permitted, muting third advertisement volume is not permitted, and pausing the third advertisement is not permitted; and
determining whether to implement an operation to be performed relative to the first, second, and third advertisements based on the respective first, second, and third control information.

11. The method of claim 10, comprising:
detecting an operation that alters playback of the broadcast advertisement;
determining whether the operation to alter the playback of the broadcast advertisement is permitted;
responsive to determining that the operation to alter the playback is not permitted, not permitting the operation to alter the playback;
in response to detecting the operation that alters playback and determining that the operation is permitted to alter the playback, retrieving a stored advertisement from a local memory based on heuristic information, wherein the heuristic information, used to select the stored advertisement, further includes a genre of advertisements preferred by a viewer.

12. The method of claim 10, comprising:
detecting an operation that alters playback of the broadcast advertisement;
determining whether the operation to alter the playback of the broadcast advertisement is permitted;
responsive to determining that the operation to alter the playback is not permitted, not permitting the operation to alter the playback;
in response to detecting the operation that alters playback and determining that the operation is permitted to alter the playback, retrieving a stored advertisement from a local memory based on heuristic information, wherein the heuristic information, used to select the stored advertisement, further includes feedback information from a viewer for the stored advertisement.

13. The method of claim 10, comprising:
detecting an operation that alters playback of the broadcast advertisement;
determining whether the operation to alter the playback of the broadcast advertisement is permitted;
responsive to determining that the operation to alter the playback is not permitted, not permitting the operation to alter the playback;
in response to detecting the operation that alters playback and determining that the operation is permitted to alter the playback, retrieving a stored advertisement from a local memory based on heuristic information, wherein the heuristic information, used to select the stored advertisement, further includes a rating for each genre of advertisement selected by a viewer.

14. The method of claim 10, comprising:
detecting an operation that alters playback of the broadcast advertisement;
determining whether the operation to alter the playback of the broadcast advertisement is permitted;
responsive to determining that the operation to alter the playback is not permitted, not permitting the operation to alter the playback;
in response to detecting the operation that alters playback and determining that the operation is permitted to alter the playback, retrieving a stored advertisement from a local memory based on heuristic information, wherein the heuristic information, used to select the stored advertisement, further includes a count value indicating the number of times that each of the plurality of advertisements stored in the local memory has been selected.

15. The method of claim 10, comprising:

detecting an operation that alters playback of the broadcast advertisement;

determining whether the operation to alter the playback of the broadcast advertisement is permitted;

responsive to determining that the operation to alter the playback is not permitted, not permitting the operation to alter the playback;

in response to detecting the operation that alters playback and determining that the operation is permitted to alter the playback, retrieving a stored advertisement from a local memory based on heuristic information; and determining whether a playback period for the stored advertisements has elapsed, and if so, selecting another stored advertisement for subsequent determination as to whether the another stored advertisement is current with a playback period that has not elapsed.

* * * * *